US005091042A

United States Patent [19]

Bruckner

[11] Patent Number: 5,091,042

[45] Date of Patent: Feb. 25, 1992

[54] APPARATUS FOR SEPARATION OF FLOOR COVERINGS ON RAISED FLOOR PANELS OR THE LIKE

[75] Inventor: Gunther Bruckner, Abtswind, Fed. Rep. of Germany

[73] Assignee: MERO-Werke, Wurzburg, Fed. Rep. of Germany

[21] Appl. No.: 570,788

[22] Filed: Aug. 22, 1990

[30] Foreign Application Priority Data

Sep. 2, 1989 [DE] Fed. Rep. of Germany ....... 3929192

[51] Int. Cl.[5] ............ B32B 35/00

[52] U.S. Cl. ............ 156/584; 156/254; 156/344; 83/874

[58] Field of Search ............ 156/344, 584, 254; 83/56, 870, 874

[56] References Cited

U.S. PATENT DOCUMENTS

| | | | |
|---|---|---|---|
| 1,383,133 | 6/1921 | Lucke | 83/874 X |
| 4,685,991 | 8/1987 | Herrmann et al. | 156/344 |
| 4,722,255 | 2/1988 | Choate et al. | 83/56 X |
| 4,867,819 | 9/1989 | Richardelli et al. | 156/566 |
| 5,000,814 | 3/1991 | Sumi | 156/344 |

FOREIGN PATENT DOCUMENTS

| | | | |
|---|---|---|---|
| 1572716 | 7/1980 | United Kingdom | 156/584 |

*Primary Examiner*—Michael W. Ball
*Assistant Examiner*—Mark A. Osele
*Attorney, Agent, or Firm*—Laubscher, Presta & Laubscher

[57] ABSTRACT

In order to rapidly and automatically separate especially worn floor coverings (12) of raised floor panels (10), preferably three separating apparatuses (17) are incorporated with motor powered cutting blades (18) in a device (13) which beneath the separating apparatuses (17) has a carriage (29) with holders (31) for the raised floor panel (10) which is to be treated. The carriage (29) can be moved by motor back and forth transverse to the cutting blades (18) of the separating apparatuses (17) or parallel to the longitudinal axis of the device (13). The separating apparatuses (17) are in turn fixed pivotally around a horizontal axis (19) on a base plate (21). Base plates (21), while being provided with springs and thus shock-absorbing, are in turn fixed on a transverse, portal-like frame part (15) movable to a limited extend in the direction of the longitudinal axis of the device (13). Carriage (29) is moved back and forth over a running nut (38) by a threaded spindle (39), which is fixed rotary movably on the frame (14) of the device (13), but is axially immovable and is driven alternately in either direction of rotation.

12 Claims, 2 Drawing Sheets

APPARATUS FOR SEPARATION OF FLOOR COVERINGS ON RAISED FLOOR PANELS OR THE LIKE

BACKGROUND OF THE INVENTION

The invention relates to an apparatus for the separation of floor coverings on raised floor panels or the like, with a motor powered cutting blade.

Known apparatuses of this type are used as manual equipment for the removal of large-surface carpeting laid out on permanent flooring, when its replacement is desired, for instance on account of wear. These apparatuses are also suitable for the loosening and stripping off of other textile foundation or floor coverings, PVC-felt or PVC-tiles and so forth. For the separation of floor coverings on raised floor panels however they are only of use conditionally, for in the case of this use the danger exists that the supporting platform element will be damaged especially at the delicate edges or border area. Also the separation of floor coverings on raised floor panels with such known apparatuses would be very time costly, for the treatment must be carried out with particular care. For local utilization, then, in other words for construction site utilization for the reconditioning of raised floors, these known apparatuses are not suitable in a practical sense.

SUMMARY OF THE INVENTION

The object of the invention is to disclose a serviceable device for the automatic separation of the floor covering from raised floor panels or the like, which avoids any threat of damage to the supporting panel part during the separation process.

The aforementioned object is attained according to the invention in that a) the separating apparatus forms a part of a device for automatic separation of the floor covering and is fastened pivotally or adjustably around a horizontal axis on a base plate, which is provided with springs and is thus shock-absorbing and is fixed movably in a horizontal or almost horizontal plane on a frame part of the device arranged transverse to the base plate to a limited extent in the direction of the longitudinal axis of the device, and b) beneath the separating apparatus is arranged a carriage with holders for a raised floor panel, which can be moved back and forth by motor transverse to the cutting blade of the separating apparatus or parallel to the longitudinal axis of the device.

With such a device floor coverings of raised floor panels can be simply and rapidly removed from or peeled off of the supporting platform element, without generating the danger that the supporting platform element be damaged, especially at the edges and border areas. The pivotal mounting of the separating apparatus around a horizontal axis facilitates optimum control of the work angle of the cutting blade and on the basis of the mounting according to the invention of the base plate supporting the separating apparatus on the frame of the device, the transfer of oscillations from the separating apparatus to the frame is held to an admissible value. For the separation of a floor covering the relevant raised floor panel need only be inserted in its holders and likewise be held and also the device must be set in operation, and in the course of the carriage movement past under the separating apparatus, its cutting blade separates or peels off the relevant floor covering from the supporting platform element, which claims relatively less time. The separating process occurs without extraneous difficulties in such a manner that the supporting platform parts can be provided immediately with a new floor covering. The device according to the invention is therefore also especially suitable for use at construction sites. Because the local reconditioning of raised floors requires building spaces to stand idle, it must be carried out in the shortest time possible.

Various details of configuration of the invention arise from the dependent claims. Thus it is advantageous if a support and guide bar is provided on the carriage for the cutting blade, which holds and/or guides the cutting blade at the beginning of the forward thrust movement of the carriage at or to the level required for the separation of a floor covering. This support and guide bar for the cutting blade represents an additional security feature of the device according to the invention, by which it is guaranteed that the contact point of the cutting blade at the beginning of a separating process lies at the correct level, in other words between the bottom floor covering and top of the supporting platform element of a raised floor panel.

According to still another configuration of the invention the base plate is arranged to be height adjustable on the transverse frame part of the device. Thus the working level of the separating apparatus can be modified in a simple manner for adaptation to different heights of the various raised floor panel types, and indeed with a constant permanent work angle of the cutting blade.

Dependent claims 4, 5 and 6 are directed to an especially simple, admissible structural arrangement of the separating apparatus on the frame of the device.

When according to still another configuration of the invention a plurality of separating apparatuses are mounted side by side one next to the other on special base plates on the transverse frame part, cutting blades with corresponding smaller work breadth could advantageously be used, which can operate with correspondingly weaker engine power. The mounting and arrangement of such separating apparatuses on the transverse frame part of the device is thus also correspondingly simpler.

According to still another preferred embodiment of the invention three separating apparatuses are provided, of which the middle apparatus is staggered opposite the other two outside separating apparatuses in axial alignment of the device, for instance is arranged protruding. This version is suitable especially for the treatment of raised floor panels with dimensions of 600×600 mm, in which the work breadth of the cutting blade is in turn somewhat more than 200 mm. Thus, because the middle of the three separating apparatuses is arranged staggered opposite the two others in axial direction along the device, a collision of the sides of the oscillating cutting blades while in operation is reliably avoided.

One preferred, weight-saving embodiment of the carriage supporting the raised floor panel is attained when the carriage consists essentially of a frame-like part, at the corners of which are arranged the holders for the raised floor panel, in which the carriage is mounted so that it can be moved back and forth as desired on two guide rails on the frame of the device.

A structurally simpler but nevertheless stronger drive of the carriage is attained in that a running nut resting on a threaded spindle is fastened to carriage, and the threaded spindle is rotary movable on the frame of the device, but is axially immovably fixed and can be driven alternately in either direction of rotation.

In any case of disturbance of the operation, for instance in the case of the cutting blade being clamped between floor covering and supporting platform element, in order to avoid damage to the separating apparatus or apparatuses, a slipper clutch is incorporated therein preferably in the drive train between drive motor and threaded spindle.

According to still another configuration of the invention the threaded spindle is sheathed for protection against contamination or fouling essentially by a conical spiral spring.

The device according to the invention is suitable for the automatic separation of most conventional floor coverings of raised floor panels, especially carpeting and PVC-coverings or the like.

BRIEF DESCRIPTION OF THE DRAWINGS

The invention is to be explained in greater detail relative to the drawings of one exemplary embodiment. In the drawings.

DESCRIPTION OF THE PREFERRED EMBODIMENTS

Figure 1:
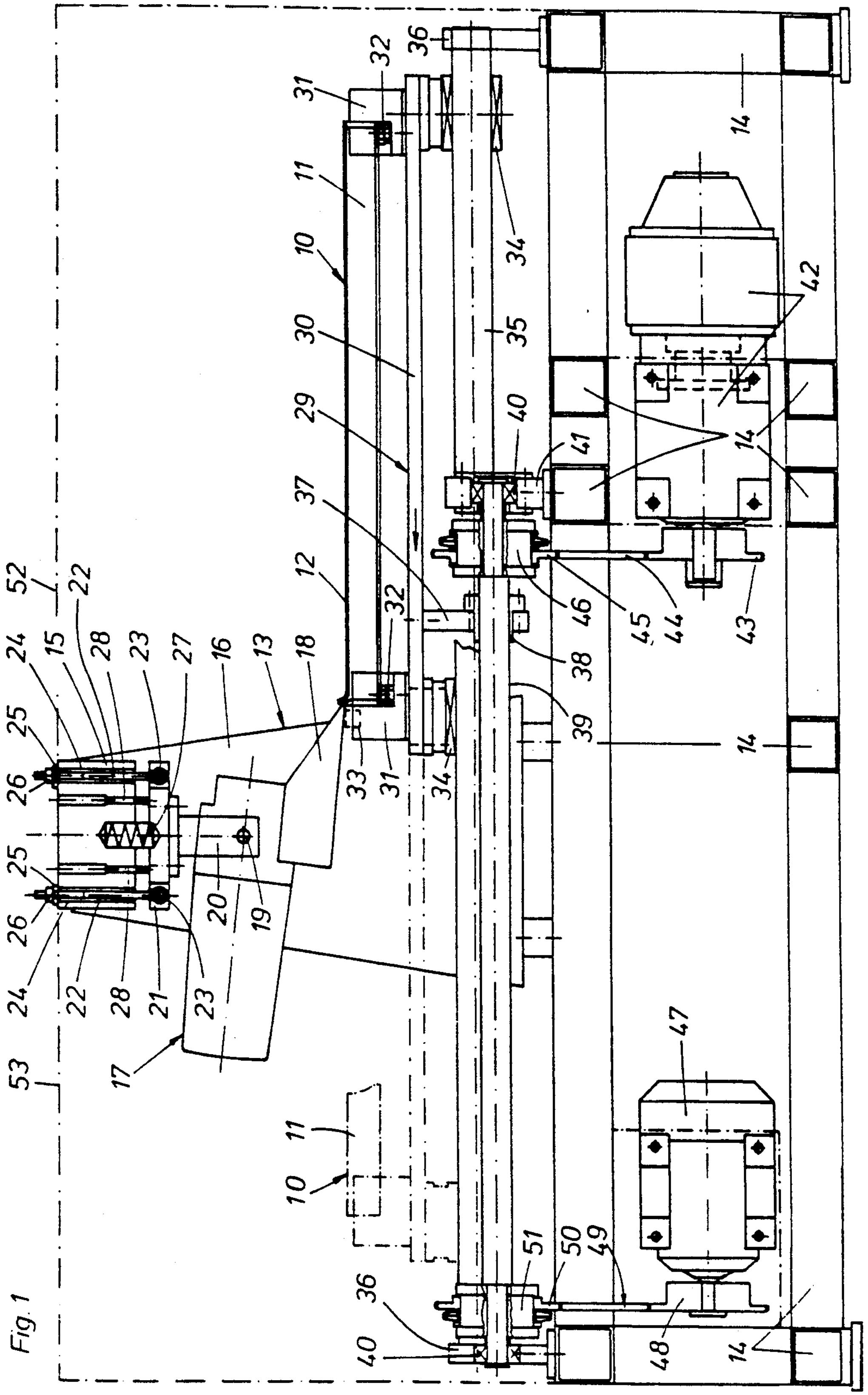
FIG. 1 is a diagrammatic side view of a device according to the invention for the automatic separation of floor coverings of raised floor panels, in which the carriage with a part of an already treated raised floor panel in its left border area is shown in dot-dash lines, in other words before the beginning of its return motion into its original position at the right, while in the right part of this drawing in full lines is shown the beginning of a separating process for a floor covering.

In FIG. 1, a raised floor panel is indicated as 10, of which the floor covering 12, for instance carpeting, is to be removed and/or separated from the supporting platform element 11. Such raised floor panels 10 are known laid out on legs at some distance from a permanent floor, so that a space is present between the raised floor panels supported on uprights and the permanent floor to receive various installation lines and wires. The removal of floor coverings 12 from supporting platform elements 11 can be required for various reasons, but generally this is required because of wear of floor coverings 12. The separation or peeling off of floor covering 12 from supporting platform element 11 is executed completely automatically by means of a device 13. It may be emphasized at this point that device 13 is also suitable for the separation of floor coverings of other relatively small-format treads or floor areas, for instance plates or tiles of so-called installation bases.

Device 13 has a supporting frame 14 of numerous square tubes. A frame part 15 is supported on frame 14 arranged resting on two side parts 16 and running transverse to the longitudinal axis of device 13. Frame part 15 with its two side parts 16 forms a portal-like support construction for for instance three similar separating apparatuses 17, each of which in turn has an oscillating cutting blade 18 powered by electric motor. The suspension or mounting of each of the three separating apparatuses 17 on frame part 15 is identical and thus only one of them is to be described in detail hereinafter.

Figure 2:
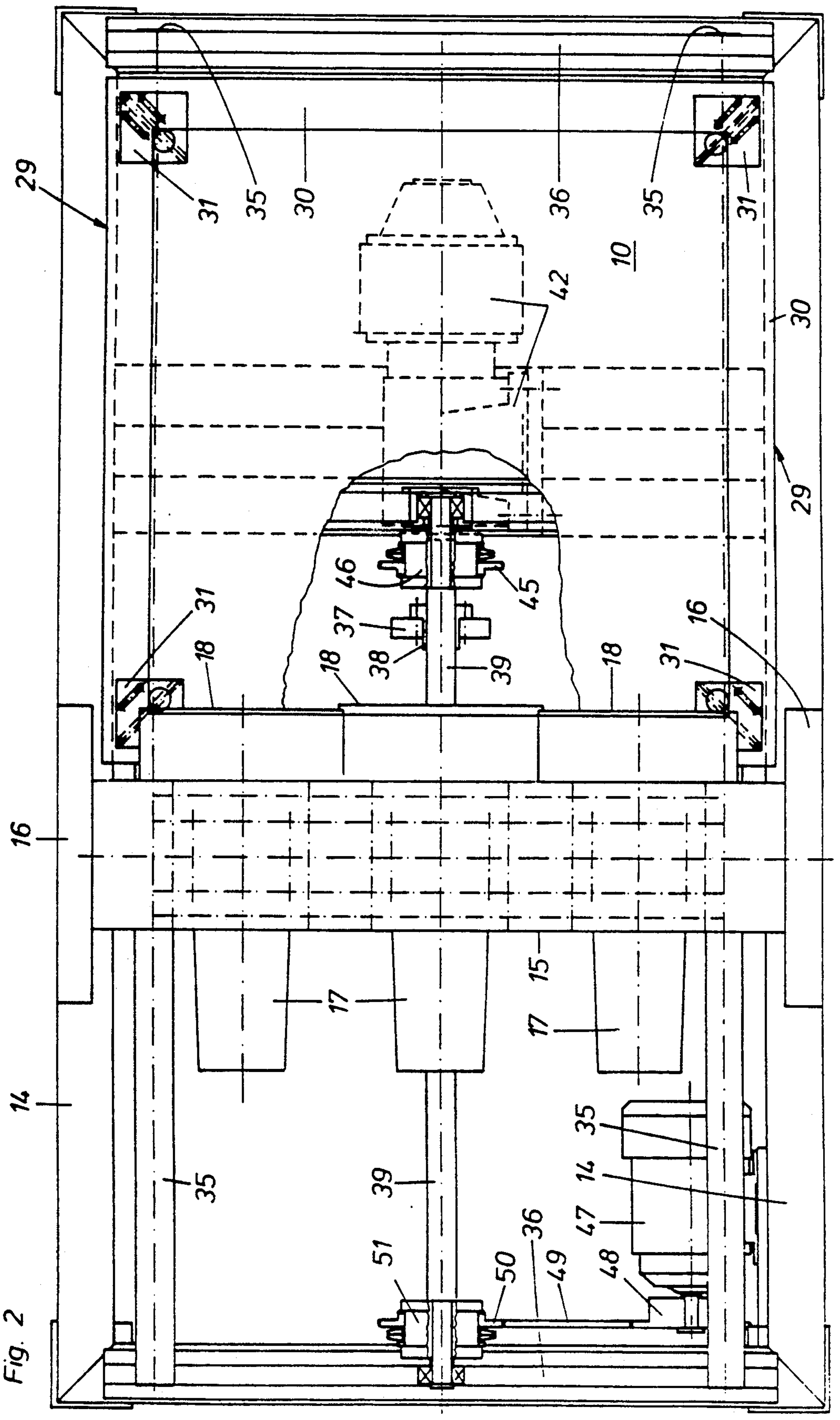
FIG. 2 shows a diagrammatic plan view of the device shown in FIG. 1, in which the raised floor panel laid out on the carriage found in its starting position is broken open partially in order to more clearly show the mounting of the threaded spindle for the drive of the carriage.

However already at this point it is to be emphasized that the middle apparatus of the three separating apparatuses 17 is staggered opposite the two outside separating apparatuses 17 in the direction of the longitudinal axis of device 13 or is arranged protruding, in order to avoid any collision of the oscillating cutting blades 18 during operation of the three separating apparatuses 17. As shown in FIG. 2, with the above arrangement the work paths of cutting blades can overlap somewhat at the sides. The raised floor panel 10 shown in FIGS. 1 and 2 for instance has a base dimension of $600\times600$ mm and the work breadth of cutting blade 18 is in turn 210 mm. When device 13 is in operation, floor covering 12 can be separated from or peeled off of supporting platform element 11 of raised floor panel 10 by the three separating apparatuses 17 in one work step together, which is to be explained in greater detail hereinafter.

Each separating apparatus 17 is mounted to be pivotal or adjustable around a horizontal axis 19 in a U-shaped holder 20, in order to be able to set the work angle of cutting blade 18 corresponding to the relevant conditions, which are assumed by the type of floor covering 12 and the supporting platform element 11. In its nonoperational setting each separating apparatus 17 is fixed by not shown screws to U-shaped holder 20. Holder 20 is tightly fastened, e.g. screwed onto a base plate 21. The rectangular base plate 21 is supported by four eyebolts 22, which are articulated by means of bolts 23 on the four corners of base plate 21. Eyebolts 22 extend with some side play through bores 24 in frame part 15 and are mounted on nuts 25 on the top of frame part 15. Suitable nut lockings are indicated at 26.

Between the middle of each base plate 21 and frame part 15 is inserted a compression spring 27. Four symmetrical screws 28 arranged on frame part 15 engage on the top side of base plate 21. The bottom ends of these screws 28 secured in their setting positions form an abutment for base plate 21, when nuts 25 are tightened. From this it is obtained that base plate 21, provided with springs and thus shock-absorbing, can be fixed in a horizontal or approximately horizontal plane to a limited extent movable parallel to the longitudinal axis of device 13, which is required in order to hold the transfer of oscillations produced by separating apparatuses 17 to frame 14 to an acceptable value. Also, on the basis of the above arrangement, base plates 21 corresponding to the three separating apparatuses 17 are mounted height adjustably on frame part 15, and adapatation of device 13 to raised floor panels 10 of different structural heights is possible.

Beneath the three separating apparatuses 17 a carriage 29 is fixed transverse to the cutting blades 18 or parallel to the longitudinal axis of device 13 powered to move back and forth on frame 14. Carriage 29 has a frame-like part 30, on the four corners of which are fastened angular holders 31 for raised floor panel 10. Raised floor panel 10 rests with its corner areas on the heads of screws 32 which can be stopped by locknuts on holders 31, which serve for the height adjustment of raised floor panel 10. Between the two holders 31 which are opposite one another, shown at the left in FIGS. 1 and 2, extends a support and guide bar 33 for the three cutting blades 18. Support and guide bar 33 can also be fastened directly to uprights on frame-like part 30. At the beginning of a forward thrust movement of carriage 29 (as shown in FIGS. 1 and 2 leftward in the direction of the arrow), this support and guide bar 33 guarantees that the separating blades 18 are located at the level required for separation of floor covering 12 and at the same time it thereby reliably prevents damage of the edge or the border area of the supporting platform element 11 by cutting blades 18, while these blades execute their oscillating movements.

Frame-like part 30 of carriage 29 is mounted on two guide bars 35 by means of four bearings 34. Guide bars 35 extend parallel to the longitudinal axis of device 13 and are fastened with their ends in rails 36, which in turn are fastened permanently to frame 14, for instance are screwed therein.

A running nut 38 resting on a threaded spindle 39 is connected with frame-like part 30 of carriage 29 through a driver (driver bolt) 37. Threaded spindle 39 is mounted at its ends in roller bearings 40, which are attached to the one rail 36 or to a part 41 of frame 14. Threaded spindle 39 is in turn mounted rotary movably on frame 14 but remains axially immovable. The spindle thereby being fixed on the frame in the direction of the longitudinal axis of the device. To produce a forward thrust movement of carriage 29 it is driven by means of a control gear engine 42, of which the driving pinion 43 is connected for instance through a drive chain 44 with a gear wheel 45, which forms a part of a slipper clutch 46, which is connected with threaded spindle 39 when in gear. Slipper clutch 46 forms a catch element in case there is a disturbance of the operation during separation of floor covering 12 from supporting platform element 11. When control gear engine 42 is connected, threaded spindle 39 is set in rotation through pinion 43, drive chain 44, gear wheel 45 and slipper clutch 46 in such a manner that running nut 38 and with it carriage 29 with raised floor panel 10 laid out on said carriage are moved to the left in FIGS. 1 and 2. The thrust velocity of carriage 29 in this case is selected so that the three cutting blades 18 of the now likewise connected separating apparatuses 17 separate or peel off floor covering 12 from the supporting platform element 11 in one work step. The beginning of this separation process is indicated in FIG. 1. When carriage 29 has attained its end position shown in FIG. 1 at the left in dot-dash lines, floor covering 12 is completely separated from platform element 11 and it can then be removed manually or even by not shown ejector devices. As soon as carriage 29 has reached its end position on the left as shown in FIG. 1, control gear engine 42 is disconnected for instance by not shown limit switches and another drive motor 47 is connected, which causes the return movement of carriage 29 with platform element 11 into the original position shown on the right in FIG. 1. This return movement of carriage 29 with platform element 11 into the starting position preferably occurs at a considerably higher velocity than the original forward thrust of carriage 29. Drive motor 47 is connected with its drive pinion 48 over a drive chain 49 with a gear wheel 50 of a slipper clutch 51 when in gear. Slipper clutch 51 rests on threaded spindle 39 and serves at the same time as a catch element, which comes into operation in case of a disturbance in the normal operation.

When drive motor 47 has moved carriage 29 back to its starting point by suitable rotation of threaded spindle 39 drive motor 47 is disconnected once again by a not shown limit switch and supporting platform element 11 can then be raised out of holders 31 of carriage 29 and removed from device 13. Device 13 is now ready for a new work step.

References 52 and 53 are two covering hoods for device 13 shown in dot-dash lines, which can be simply folded back to open device 13.

Threaded spindle 39 can be sheathed by a conical spiral spring inserted between driver 37 and slipper clutch 51, which conical spiral spring protects threaded spindle 39 from fouling or contamination.

One of the two drive motors 42, 47 provided in the exemplary embodiment for threaded spindle 39 can be abandoned if a drive motor is provided which can be activated as desired alternately in two directions of rotation.

What is claimed is:

1. Device for the separation of floor coverings on raised floor panels, with a motor-powered cutting blade, characterized in that (a) the separating apparatus (17) forms a part of the device for the automatic separation of floor coverings (12) and is fastened pivotally and adjustably around a horizontal axis (19) to a base plate (21) which, provided with springs and thus shock-absorbing, is fixed in a horizontal or approximately horizontal plane on a transverse frame part (15) of the device (13), the base plate (21) being movable to a limited extent in the direction of the longitudinal axis of the device (13), and (b) a carriage (29) with holders (31) for a raised floor panel (10) is arranged beneath the separating apparatus (17), which can be moved back and forth by motor transverse to the cutting blade (18) of the separating apparatus (17) and parallel to the longitudinal axis of the device (13).

2. Device as in claim 1, characterized in that a support and guide bar (33) for the cutting blade (18) is provided on the carriage (29), where it guides the cutting blade (18) at the beginning of a forward thrust movement of the carriage (29) to a position for the separation of a floor covering (12).

3. Device as in claim 1, characterized in that the base plate (21) is mounted to be height adjustable on the transverse frame part (15) of the device (13).

4. Device as in claim 1, characterized in that the separating apparatus (17) is fixed pivotally or adjustably in a U-shaped holder (20), which is fastened to the base plate (21).

5. Device as in claim 1, characterized in that the base plate (21) is supported by eyebolts (22) suspended on the transverse frame part (15) of the device (13), and that between the base plate (21) and the transverse frame part (15) of the device (13) is inserted at least one compression spring (27).

6. Device as in claim 1, characterized in that screws (28) are positioned to engage the top of the base plate (21) and are fastened to the transverse frame part (15) of the device (13) and form abutment support for the base plate (21).

7. Device as in claim 1, characterized in that a plurality of separating apparatuses (17) are fixed side by side one adjacent to the other over corresponding base plates (21) on the transverse frame part (15).

8. Device as in claim 7, characterized in that three separating apparatuses (17) are provided, of which the middle apparatus is staggered opposite the two outside separating apparatuses (17) in the direction of the longitudinal axis of the device (13).

9. Device as in claim 1, characterized in that the carriage (29) consists essentially of a frame part (30), at the corners of which the holders (31) are arranged for the raised floor panel (10) and that the carriage (29) is fixed so that it can be moved back and forth on two guide rails (35) on the frame (14) of the device (13).

10. Device as in claim 1, characterized in that a running nut (38) mounted on a threaded spindle (39) is fastened to the carriage (29), and the threaded spindle (39) is rotatably mounted on the frame (14) of the device (13) and can be rotated by a drive motor (42, 47) on the frame (14) of the device (13) in either direction of rotation, said spindle (39) being fixed on the frame (14) in the direction of the longitudinal axis of the device (13).

11. Device as in claim 10, characterized in that the drive motor (42, 47) and threaded spindle (39) are connected by a slipper clutch (46, 51).

12. Device as in claim 10, characterized in that the threaded spindle (39) is sheathed for protection against contamination by a conical spiral spring.

* * * * *